US009829122B2

(12) United States Patent
Lawrence

(10) Patent No.: US 9,829,122 B2
(45) Date of Patent: *Nov. 28, 2017

(54) LEACH-RESISTANT LEADED COPPER ALLOYS

(71) Applicant: NIBCO INC., Elkhart, IN (US)

(72) Inventor: Benjamin L. Lawrence, Elkhart, IN (US)

(73) Assignee: NIBCO INC., Elkhart, IN (US)

( * ) Notice: Subject to any disclaimer, the term of this patent is extended or adjusted under 35 U.S.C. 154(b) by 730 days.

This patent is subject to a terminal disclaimer.

(21) Appl. No.: 13/802,995

(22) Filed: Mar. 14, 2013

(65) Prior Publication Data

US 2013/0192709 A1     Aug. 1, 2013

Related U.S. Application Data

(63) Continuation-in-part of application No. 13/670,823, filed on Nov. 7, 2012.

(60) Provisional application No. 61/556,376, filed on Nov. 7, 2011.

(51) Int. Cl.

| | |
|---|---|
| *C22C 9/00* | (2006.01) |
| *C22C 9/04* | (2006.01) |
| *C22C 9/06* | (2006.01) |
| *C22C 9/08* | (2006.01) |
| *C22C 9/10* | (2006.01) |
| *F16L 9/02* | (2006.01) |
| *C22F 1/08* | (2006.01) |
| *C22C 1/02* | (2006.01) |
| *C22C 9/01* | (2006.01) |
| *C22C 9/02* | (2006.01) |
| *C22C 1/00* | (2006.01) |
| *C22C 9/05* | (2006.01) |

(52) U.S. Cl.
CPC ...... *F16L 9/02* (2013.01); *C22C 1/00* (2013.01); *C22C 1/02* (2013.01); *C22C 9/01* (2013.01); *C22C 9/02* (2013.01); *C22C 9/04* (2013.01); *C22C 9/05* (2013.01); *C22C 9/06* (2013.01); *C22C 9/08* (2013.01); *C22C 9/10* (2013.01); *C22F 1/08* (2013.01)

(58) Field of Classification Search
CPC .... C22C 9/00; C22C 9/04; C22C 9/08; C22C 9/06; C22C 9/10; C22F 1/08; F16L 9/02
See application file for complete search history.

(56) References Cited

U.S. PATENT DOCUMENTS

| | | | |
|---|---|---|---|
| 3,012,917 A | 12/1961 | Riou et al. | |
| 4,113,474 A | 9/1978 | Okano | |
| 4,417,929 A | 11/1983 | Tomaru | |
| 5,137,685 A | 8/1992 | McDevitt et al. | |
| 5,409,552 A * | 4/1995 | McDevitt | C22C 9/04 148/434 |
| 5,565,045 A * | 10/1996 | Caron | C22F 1/08 148/432 |
| 5,788,924 A | 8/1998 | Kobayashi et al. | |
| 6,162,547 A | 12/2000 | van Ooji et al. | |
| 2010/0303667 A1* | 12/2010 | Lazarus | C22C 9/04 420/472 |
| 2012/0058005 A1* | 3/2012 | Song | C22C 9/04 420/475 |
| 2012/0082588 A1 | 4/2012 | Kobayashi et al. | |
| 2012/0121455 A1* | 5/2012 | Murray | C21C 7/0006 420/471 |
| 2013/0192709 A1 | 8/2013 | Lawrence | |
| 2013/0294965 A1 | 11/2013 | Sahoo et al. | |

FOREIGN PATENT DOCUMENTS

| | | | |
|---|---|---|---|
| DE | 102006054761 A1 | 5/2008 | |
| JP | 11293366 A * | 10/1999 | ........... C22C 9/04 |
| JP | 2006152373 A | 6/2006 | |
| WO | 9522028 | 8/1995 | |

OTHER PUBLICATIONS

JP11293366, Aoyanagi, Published Oct. 1999. (Machine translation).*
Biwalite Co. Ltd., Need a Lead Free Copper Alloy Casting? CDA C83470 in 2010, Brochure, 2010, 4 pages.
Kammlott et al., Atmospheric Sulfidation of Copper Alloys: I. Brasses and Bronzes, Journal of the Electrochemical Society, vol. 131, 1984, pp. 505-511.

* cited by examiner

*Primary Examiner* — Keith Walker
*Assistant Examiner* — John Hevey
(74) *Attorney, Agent, or Firm* — Price Heneveld LLP

(57) ABSTRACT

Copper alloys exhibiting enhanced oxidation resistance are provided by adding an amount of sulfur that is effective to enhance oxidative resistance. Such sulfur addition can be achieved by combining elemental forms of copper and sulfur and heating the mixture to form a molten alloy, or by forming a sulfur-rich pre-mix that is added to a base alloy composition. Forming a pre-mix provides improved homogeneity and distribution of the sulfur predominantly in the form of a metal sulfide.

10 Claims, No Drawings

LEACH-RESISTANT LEADED COPPER ALLOYS

CROSS-REFERENCE TO RELATED APPLICATIONS

This application is a continuation-in-part under 35 U.S.C. §120 of U.S. patent application Ser. No. 13/670,823 filed Nov. 7, 2012, entitled "SULFUR-RICH CORROSION RESISTANT COPPER-ZINC ALLOY," now published as U.S. Patent Application Publication No. 2013/0115128, and claims priority under 35 U.S.C. §119(e) to U.S. Provisional Patent Application No. 61/556,376, filed Nov. 7, 2011, entitled "SULFUR-RICH CORROSION-RESISTANT COPPER-ZINC ALLOY," which are herein incorporated by reference in their entirety.

FIELD

Disclosed are sulfur-rich, corrosion and leach-resistant leaded copper alloys and methods for preparing same.

BACKGROUND

Sulfur is typically an incidental impurity in copper alloys, and is typically present in an amount that does not exceed 0.005% by weight. In fact, it is disclosed in the published literature that sulfur in an amount greater than 0.01% by weight may negatively impact certain copper-based alloys, causing the copper alloy to become brittle.

However, it is known to add sulfur to copper alloys to impart improved machinability. More specifically, sulfur has been added to molten ferrous and non-ferrous alloys (including copper alloys) to promote free-machining characteristics. The sulfur acts singularly or in combination with other alloy constituents to produce particles that act as chip breakers during machining. For example, U.S. Pat. No. 5,137,685 discloses the addition of sulfur to copper alloys, in combination with bismuth, in order to improve machinability. However, this patent expressly places an upper limit for sulfur at about 2% by weight, and indicates a preference for an amount of sulfur that is from about 0.1% to about 1.0%.

Generally, the insolubility of free sulfur and of sulfur-rich inter-metallic compounds in the alloy matrix is understood to determine the effectiveness of sulfur addition for improving machinability. It is widely believed that the known benefit of adding sulfur to a copper alloy is limited to improved machinability, and that the known copper alloys incorporating sulfur, even those exhibiting improved machinability due to sulfur addition, do not exhibit enhanced corrosion resistance.

From a historic perspective, lead has also long been added to copper alloys to improve machining of the alloys. Lead adds lubrication during machining and acts to break up machine chips. However, lead is potentially toxic, and it is desirable to limit contact of potable water with lead under conditions that may lead to the lead leaching into the water.

SUMMARY

One aspect of the present invention includes a copper alloy having a composition of at least 50% copper by weight, less than about 10% lead by weight, and an amount of sulfur that is effective to enhance the oxidative resistance of lead within the copper alloy.

Another embodiment includes a water-conveying conduit system having a conduit component fabricated from a copper alloy having a composition of at least 50% copper by weight, between about 0.0% and about 10% lead, and an amount of sulfur that is effective to enhance the oxidative resistance of lead within the copper alloy.

Another embodiment disclosed herein is a process for preparing an oxidation resistant copper alloy, including the steps of combining copper, lead and sulfur to form a molten alloy. The copper comprises greater than about 50% by weight of the molten alloy. The lead comprises less than about 10% by weight of the molten alloy, and the sulfur is present in an amount that is effective to enhance oxidative resistance of the alloy. The molten alloy is then allowed to cool and thereby solidify.

These and other features, advantages, and objects of the present invention will be further understood and appreciated by those skilled in the art by reference to the following specification, claims, and appended drawings.

DETAILED DESCRIPTION

This disclosure is concerned primarily with the addition of a sulfur additive to a leaded copper alloy to reduce the lead leaching from the leaded copper alloy, the method of preparation of a sulfur enriched leaded copper alloy, and the use of such a sulfur enriched leaded copper alloy to form plumbing components which are resistant to lead leaching.

All percentages, unless otherwise indicated herein, refer to the amount by weight of the element, irrespective of whether the element is present in the alloy in its elemental form or in the form of an inter-metallic complex.

As used herein, unless expressly stated otherwise, the term "oxidative resistance" (or "oxidation resistant") refers to resistance to corrosive attack which causes lead to be released or to leach from the alloy.

The copper alloys described herein are generally referred to as alloys or copper alloys, and include alloys in which the element in greatest abundance is copper, and wherein the alloy has at least 50% copper, by weight. The copper alloys described herein optionally include zinc from about 0% to about 45%. Alloys with a higher zinc content, e.g., greater than about 10%, are more susceptible to separation of the zinc into a separate zinc rich phase, while alloys with a lower zinc content generally have a more homogenous distribution than the high-zinc content alloys. Additional alloying elements are optionally present from about 0% to about 6% each, including without limitation silicon, selenium, tellurium, manganese, bismuth, antimony, phosphorous, tin, iron, nickel, aluminum, cadmium, silver, and arsenic. The additional alloying elements may provide desirable properties or characteristics to the alloy, or may be present as impurities or incidental alloying elements.

The copper alloys described herein also contain some amount of lead, whether deliberately added or present at a low level of unavoidable lead impurity. Embodiments of this invention include sulfur-enriched copper alloys that contain lead, ranging from trace amounts to about 10% lead by weight. The presence of lead in only trace amounts as an unavoidable impurity is generally referred to as "substantially free of lead" or "lead-free" and such alloys generally contain lead in an amount of less than about 0.25%. The oxidation resistance of copper alloys having lead as a component thereof can be improved through the addition of sulfur, including zinc-rich copper alloys.

The copper alloys also include sulfur. The sulfur is effective in enhancing the oxidative resistance of the lead, and reducing corrosion of lead constituents from within the alloy, thereby, reducing the migration of lead from the alloy. Such reduction of the migration of lead allows certain copper alloys described herein to be used as plumbing components for transport of potable waters. The amount of sulfur is from about 0.006% to about 4% by weight of the copper alloy, and is sometimes referred to herein as the "sulfur additive."

Lead is nearly insoluble in copper, with a maximum solubility of about 0.05%. Therefore, lead is expected to be found as a segregate phase within copper alloys. The lead is generally in a separate phase even when low amounts of lead are present in the copper alloy, such as when the alloy meets current government standards to be labeled as "lead-free," i.e., having less than about 0.25% lead, or when only trace amounts of lead are present, i.e., from about 0.006% (lower limit of detection) to about 0.09%.

The addition of sulfur to a leaded copper alloy increases the oxidation resistance of lead in the leaded copper alloy. Sulfur and lead are both largely insoluble in the matrix of copper alloys; sulfur being rejected to grain boundaries and/or combined with other alloying elements to form inter-metallic constituents, and lead segregating as discrete pools that are available to be combined with sulfur. The limited solubility of each lead and sulfur within the alloy results in a tendency for the lead and sulfur to combine. Thus, sulfur and lead are naturally brought together within the alloy in the form stable lead sulfide.

Unlike previously known sulfur additions to leaded copper alloys, which generally sought to segregate sulfur in large sulfur-rich phases to improve machinability, certain processes disclosed herein seek to achieve a distribution of sulfur in the copper alloy in the form of a lead sulfide constituent. The sulfur provides a benefit even when it is present at levels that are only a fraction of the amount of lead in the alloy. Sulfur is believed to provide an oxidation resistance benefit when it is homogeneously distributed in the lead segregate or when it is adsorbed along the surface of the lead but not homogeneously throughout the lead segregate.

Sulfur-enriched leaded copper alloys also demonstrate excellent mechanical properties, including high ductility, and are considered to be highly resistant to stress corrosion cracking. Also, the observed high ductility is considered to have an important benefit with respect to cold working of certain copper alloys. The presence of inter-granular metal sulfide is believed to promote slip along grain boundaries, resulting in reduced yield strength and higher percent elongation for certain copper alloys.

A further advantage of creating a combined lead sulfide segregate within the alloy relates to elevated temperature performance of the alloy. The melting point of lead is approximately 621° F. The relatively low melt point of lead versus the melt point the copper alloy is a limiting factor in high temperature applications. The segregated lead constituent within the alloy can preferentially melt, which means that the lead melt point can limit the useful service temperature of a part manufactured with a leaded copper alloy. Given that the melting point of lead sulfide is approximately 2044° F., conversion of the lead segregate to a lead sulfide provides a benefit at high temperatures.

Where the copper alloy has a high zinc content, e.g., greater than 10%, the addition of sulfur imparts a generalized oxidation resistance to the zinc-copper alloy. Even small amounts of sulfur are at least as effective at imparting resistance to dezincification as conventional corrosion inhibiting additives such as arsenic, antimony, and phosphorus.

However, retention of sulfur within molten high-zinc alloys may be limited due to the high reactivity of sulfur and zinc. The relative difference in specific gravity between zinc sulfide and molten copper is such that a zinc-sulfur inter-metallic compound tends to float out of a liquid bath as slag. Sulfur may also be lost due to combination with free oxygen within the liquid bath and be released from the liquid bath as a sulfur dioxide emission. A reduction of sulfur loss from a high zinc copper alloy liquid bath is achieved through addition of aluminum to the liquid bath. Other elements are also expected to improve sulfur retention through the molten phase of alloy formation, such as bismuth, cadmium, iron, manganese, silver, tellurium, and tin.

However, the use of these sulfur-retention elements is not necessarily beneficial in improving de-alloying resistance of the lead segregate portion of the copper alloy, as the addition of these sulfur-retention elements distributes sulfur throughout the alloy, leading to less sulfur available to react with the lead segregate (and thus imparting less corrosion resistance to the lead segregate) and resulting in less sulfur along grain boundaries. To compensate, additional sulfur may be added to the molten high zinc leaded copper alloy to allow a portion of the sulfur to be distributed throughout the matrix of the alloy, and another portion of the sulfur to remain available for combining with the lead segregate. Where lower zinc content copper alloys are used, dezincification is often less of a concern, and it may not be necessary or desirable to use sulfur-retention elements to distribute the sulfur throughout the matrix.

The reaction between lead and sulfur, and the relative percentages of lead and lead sulfide that constitute the segregate, are impacted by the availability of sulfur and the temperature history of the alloy. In particular, the miscibility of lead and sulfur in the copper alloy is influenced by the heating of the alloy, in addition to the use of sulfur-retention elements. The thermal effects on the lead-sulfur mixture are shown through a mono-eutectic reaction as the copper alloy is heated to 800° C. (approximately 1475° F.) and cooled to produce a lead sulfide-rich product.

In alloys having low levels of lead, such as alloys with from about 0.006% to about 0.09%, a post-casting heat treatment can be used to segregate as much lead from the alloy matrix as possible, and allow the segregated lead to react with added sulfur to form a lead sulfide, which generally remains segregated within the alloy, thereby reducing the lead leaching from the sulfur-enriched alloy. Reducing the amount of lead leaching even from an alloy having a low level of lead present can aid in reaching a goal of no lead leaching from the alloy.

One post-casting heat treatment methodology involves heat treatment at a temperature of from about 1000° F. to about 1450° F., with a soak time of from about one hour to about two hours and air quench. The higher the temperature used, the less soak time may be needed to obtain desired heat treatment results.

When lead is present in excess of 0.09%, there is a relative abundance of free lead in a segregated phase. A heat treatment as described above may be performed to further segregate lead from the alloy matrix. Heat treat temperatures in excess of 1400° F. applied to alloys having a sulfur content of from about 2% to about 4% are expected to lead to the highest percentage of lead sulfide. Single phase copper alloys (i.e., alloys that have less than about 15% zinc) are less susceptible to becoming de-alloyed upon heat treatment than alloys having a zinc-rich phase, making these alloys good candidates for heat treatment to enhance the lead-sulfur reaction. Heat treatment may potentially reduce the corrosion resistance (e.g., resistance to dezincification) of alloys with separate zinc-rich phases. Therefore, when high zinc alloys are intended to be heat treated, the amount of sulfur added to increase the oxidation resistance of the lead segregate and the corrosion resistance of the zinc components of the copper alloy may be increased. Heat treatment of sulfur-enriched alloys may provide additional benefits, such as improved free-machining properties as a result of the agglomeration of sulfur (or of sulfur and lead) into chip-breaking constituents.

The segregate phase of lead present within a leaded alloy is available to oxidative attack in even modestly corrosive waters. The lead segregate phase is more susceptible to oxidative attack than the surrounding copper alloy. The selective oxidative attack on lead is the mechanism by which lead is released from the copper alloy into waters conveyed by parts manufactured of the copper alloy. However, the lead in a segregated phase is generally available to combine with sulfur, to form a lead sulfide constituent. Lead sulfide is relatively insoluble as compared to the common lead segregate phase within a leaded copper alloy.

Currently, copper alloys having up to about 0.25% lead can be used in the United States for components to deliver potable water if the amount of lead in the water delivered by the components is less than 5 parts-per-billion. Sulfur enrichment, as described herein, is one way to minimize the leaching of lead from components having even low levels of lead (which may be trace amounts or intentionally added to aid machining of the copper alloy), to assist in maintaining the lead content in the water below regulatory limits. Sulfur enrichment as described herein is a practical way to mitigate leaching and assist in meeting the lead content limits for potable water, as the added sulfur combines with the lead to promote a stable, corrosion-resistant lead sulfide that is useful in preventing lead migration (or leaching) into potable water.

Lead content and leaching are often not regulated for non-potable water service copper alloys, i.e. copper alloys with a lead content greater than about 0.25% by weight. Regardless of the lack of regulatory coverage, sulfur-enrichment of these leaded copper alloys is seen as a positive with respect to limiting health and environmental risks associated with the migration or leaching of lead from the alloys. This also permits lead to be added as a processing aid, while limiting the amount of lead that may leach into the environment.

The sulfur-enriched copper alloys disclosed herein can be prepared by a conventional process in which elemental sulfur is simply added directly to a copper furnace melt. This method involving the late addition of sulfur appears to provide less control over sulfur content than other processes disclosed herein. Late additions of elemental sulfur tend to generate excess sulfur dioxide fuming in non-controlled atmospheres, and may result in substantial sulfur loss due to the low vapor point of sulfur and potential reactions between sulfur and certain metals in the melt, including zinc when it is present in the copper melt. The risk of release of toxic sulfur dioxide and metal sulfide releases can be mitigated through the use of proper melting equipment and practices, such using an inert gas cover over the molten bath, which eliminates exposure of the metal to oxygen and mitigates sulfur dioxide evolution.

In an alternative method, sulfur and copper are combined, and then heated under conditions suitable to form a molten alloy. In this process, elemental copper and sulfur (e.g., powder form) are placed in a containment vessel and heated to a molten state to produce a sulfur-copper mix. Additional elements, such as aluminum, may be added to the copper-sulfur mix to help retain the sulfur within the melt. Additional alloying elements may also be added to the mix to complete the copper alloy, such as silicon, selenium, tellurium, zinc, tin, iron, nickel, aluminum, manganese, bismuth, antimony, phosphorous, arsenic, etc.

Another alloy preparation method includes combining sulfur and a secondary alloying ingredient together to create an additive pre-mix. For example, sulfur powders can be melted together with metal powders or metal solid forms in an oxygen-free containment vessel to produce sulfur-metal mixtures that can be added to a molten alloy bath containing the remaining constituents of the copper alloy. Certain pre-mix combinations are preferred due to the reaction and loss of sulfur in specific alloys. The metals that can be used in the premix include without limitation, copper, zinc, aluminum, bismuth and tin.

For example, the sulfur may be prepared as a sulfur-rich pre-mix with a smaller amount of copper or other metal, and added to a copper base alloy. Additional elements may be added before or after the introduction of the sulfur-rich pre-mix with the base alloy.

Formation of the pre-mix is believed to ensure that a larger proportion of the elemental sulfur addition is homogeneously distributed within the completed alloy, or throughout the lead segregate phase of the alloy, and that the sulfur is present in the form of an intermetallic sulfide, i.e., lead sulfide. A pre-mix as described herein can also be used to adjust the sulfur content in a copper alloy directly before casting.

The addition of sulfur in the form of a copper-based pre-mix may also aid in removing oxides from the molten metal. This late alloy addition may offer an alternative to traditional deoxidizing additives such as phosphorus copper.

Once the sulfur alloy has been properly constructed, sulfur levels have only modest loss through repeated re-melting. The metal off-fall streams of manufacturing (such as gating and scrap) can be melted repeatedly for reuse without any significant loss of sulfur.

In addition to enhanced corrosion resistance, other benefits have been demonstrated by the disclosed sulfur additions to copper alloys. For example, heat treatment of such alloys has proven to improve free-machining properties of sulfur-rich alloys by agglomerating the sulfur and lead into lead sulfide chip-breaking constituents. The melting temperature of the lead sulfide is higher than that of lead, allowing parts manufactured from the leaded copper alloys to be used in higher temperature applications. Preliminary data also suggests that the disclosed sulfur treatment does not have a detrimental effect on soldering, and may actually improve solder-ability. The intermetallic sulfide at the surface of a casting made of the leaded copper alloys appears to be cleaned by zinc chloride flux without adverse corrosion or unwanted flux to metal reaction during soldering. Sulfur treated parts have also maintained corrosion resistance after the treatment with dilute citric acid and/or ultrasonic cleaning.

The copper alloys described herein are sufficiently resistant to corrosion that they are expected to be suitable for use in the fabrication of a plumbing component or other component used in a water-conveying conduit system (e.g., cooling tower piping).

One example of a sulfur-enriched leaded copper alloy is an alloy containing about 87% copper, about 6% tin, about 3% zinc, about 2% lead and about 2% sulfur. Another example of a sulfur-enriched leaded alloy is an alloy containing about 88% copper, about 6% tin, about 3% zinc, about 2% bismuth, about 0.8% sulfur, and about 0.2% lead. Another example of a sulfur-enriched leaded high-zinc copper alloy is an alloy containing about 34.5% zinc, about 0.5% lead, about 0.5% sulfur, about 0.5% tin and about 0.1% aluminum, and the remainder copper.

It is also important to note that the current disclosure includes exemplary embodiments, and is illustrative only. Although only a few embodiments of the present innovations have been described in detail in this disclosure, those skilled in the art who review this disclosure will readily appreciate that many modifications are possible (e.g., variations in additives, heating times, heating temperatures, dimensions and structures manufactured from the alloys, etc.) without materially departing from the novel teachings and advantages of the subject matter recited. Accordingly, all such modifications are intended to be included within the scope of the present innovations. Other substitutions, modifications, changes, and omissions may be made in the composition, design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned compositions, structures and methods without departing from the concepts of the present invention, and further it is to be understood that such concepts are intended to be covered by the following claims unless these claims by their language expressly state otherwise.

What is claimed is:

1. A leaded copper alloy having an elemental composition comprising:
    at least 50% copper by weight;
    phosphorous, antimony and tin, each less than 0.006% by weight;
    an amount of lead from about 0.09% to about 0.25% by weight, the lead comprising a lead segregate phase;
    an amount of silicon from about 0.5% to about 6% by weight;
    an amount of zinc from about 35% to about 45% by weight; and
    an amount of nickel from about 0.1% to about 6% by weight;
    an amount of sulfur from about 2.5% to 4% by weight and that is effective to enhance oxidative resistance of lead within a copper alloy,
    wherein the amount of sulfur is throughout a substantial bulk of the alloy within the lead segregate phase in the form of a lead sulfide.

2. An alloy according to claim 1, further comprising one or more additives selected from the group consisting of selenium, tellurium, manganese, bismuth, iron, aluminum, and arsenic, each of the one or more additives present in an amount from about 0.1% to about 6% by weight.

3. A water-conveying conduit system comprising:
    a conduit component fabricated from a leaded copper alloy comprising at least 50% copper by weight; an amount of lead from about 0.09% to about 0.25% by weight, the lead comprising a lead segregate phase; an amount of silicon from about 0.5% to about 6% by weight; phosphorous, antimony and tin, each less than 0.006% by weight; an amount of zinc from about 35% to about 45% by weight; an amount of nickel from about 0.1% to about 6% by weight; and an amount of sulfur from about 2.5% to 4% by weight and that is effective to enhance oxidative resistance, wherein the amount of sulfur is through a substantial bulk of the alloy within the lead segregate phase in the form of a lead sulfide.

4. A process for preparing an oxidation resistant leaded copper alloy, comprising the steps of:
    combining copper, lead, zinc, silicon, nickel, and sulfur to form a molten alloy, wherein the copper is present in an amount greater than about 50% by weight of the molten alloy, the lead is present from about 0.09% to about 0.25% by weight of the molten alloy, the lead comprising a lead segregate phase, the zinc is present from about 35% to about 45% by weight of the molten alloy, the silicon is present from about 0.5% to about 6% by weight, the nickel is present from about 0.1% to about 6% by weight, and the sulfur is present in an amount from about 2.5% to 4% by weight and that is effective to enhance oxidative resistance of the alloy; and
    allowing the molten alloy to cool and thereby solidify, wherein phosphorous, antimony and tin are at trace amounts in the alloy, each less than 0.006% by weight, and
    further wherein the amount of sulfur is through a substantial bulk of the alloy within the lead segregate phase in the form of a lead sulfide.

5. The process according to claim 4, further comprising the step of:
    heat treating the solidified alloy.

6. The process according to claim 5, wherein the step of heat treating the solidified alloy comprises raising the temperature of the alloy from about 1000° F. to about 1450° F. and maintaining the increased temperature for about 1 hour to about 2 hours.

7. The process according to claim 4, wherein the step of combining the copper, lead, and sulfur includes the steps of:
    preparing a base alloy;
    preparing a molten pre-mix containing sulfur and a pre-mix metal; and
    adding the molten pre-mix to the base alloy.

8. The process according to claim 7, wherein the step of preparing the molten pre-mix comprises combining the sulfur and the pre-mix metal, the pre-mix metal chosen from the group consisting of copper, zinc, aluminum, lead, bismuth, and a combination thereof.

9. The process according to claim 8, wherein the step of preparing the base alloy comprises melting copper to form the base alloy, the base alloy comprising molten copper.

10. The process according to claim 9, wherein the step of preparing the base alloy further comprises adding at least one additive selected from the group consisting of selenium, tellurium, manganese, bismuth, iron, aluminum, and arsenic, each of the one or more additives in an amount from about 0.1% to about 6% by weight.

* * * * *